No. 698,251. Patented Apr. 22, 1902.
G. B. BLANCHARD.
CROSS BOND FOR RAILS.
(Application filed Jan. 30, 1902.)

(No Model.)

Witnesses:
H. B. Davis.
J. W. Deerow.

Inventor:
George B. Blanchard
by B. J. Hayes
Atty.

UNITED STATES PATENT OFFICE.

GEORGE B. BLANCHARD, OF TACOMA, WASHINGTON.

CROSS-BOND FOR RAILS.

SPECIFICATION forming part of Letters Patent No. 698,251, dated April 22, 1902.

Application filed January 30, 1902. Serial No. 91,849. (No model.)

*To all whom it may concern:*

Be it known that I, GEORGE B. BLANCHARD, of Tacoma, county of Pierce, State of Washington, have invented an Improvement in Cross-Bonds for Rails, of which the following description, in connection with the accompanying drawings, is a specification, like letters on the drawings representing like parts.

This invention has for its object the production of a cross-bond for rails which may be firmly secured to the rails and a good connection insured for the passage of the current.

The invention consists in a cross-wire having at each end a laterally-projecting strip, the extremity of which is adapted to be attached to or connected with the rails. In the preferred embodiment of my invention this laterally-projecting strip consists of a laminated strip composed of a plurality of superimposed layers of copper or other material, and said laminated strips are soldered or otherwise secured to the ends of the cross-wire and are provided at their extremities with flat feet adapted to be soldered to the rails and also provided with extensible portions intermediate their ends. My invention, however, includes within its scope any other form or construction of laterally-projecting strips attached to the ends of a cross-wire adapted to be attached to or connected with the rails.

Figure 1:
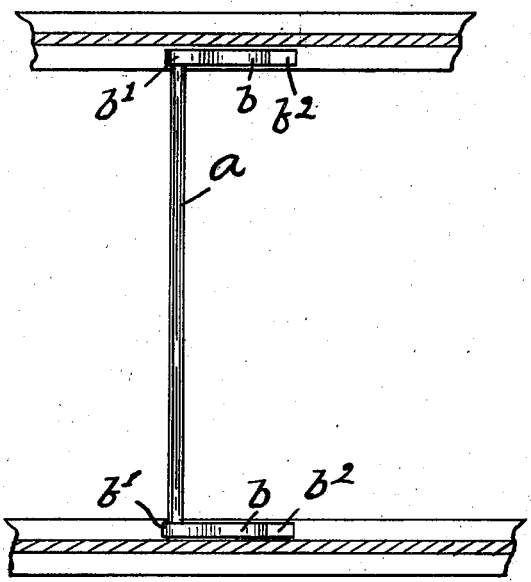
Figure 2:
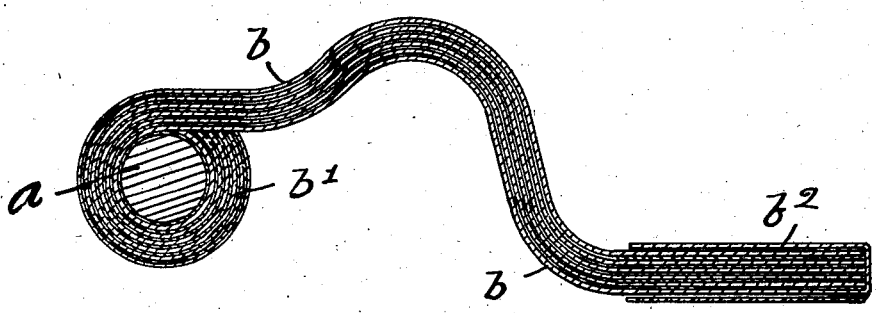

Figure 1 shows in plan view a cross-bond embodying this invention, and Fig. 2 is an enlarged cross-sectional detail of one of the laterally-projecting strips.

$a$ represents the cross-wire, which is herein shown as circular in cross-section, yet it may be of any other shape in cross-section.

The cross-wire $a$, which is made of any suitable length, is herein shown as a single piece of metal, yet so far as my invention is concerned any other form or construction of strip may be employed adapted to serve as a cross-wire. The strip projects laterally from each end of the cross-wire for the attachment of said cross-wire to the rails, and, as herein shown, this strip is made as a laminated strip comprising a plurality of layers $b$, soldered together at each end and unattached along their intermediate portions. The intermediate portion of the laminated strip is bent or formed to provide an extensible portion, yet this is not absolutely necessary. One end of the laminated strip is wound around the cross-wire, as at $b'$, and is secured thereto by solder, yet it may be otherwise attached to said cross-wire. The opposite end of the laminated strip is formed as a flat foot $b^2$, and on the bottom thereof a thick layer of sheet-solder is attached, preferably at one end only.

This bond will be attached to the rails by first cleaning a spot on the rail, then heating the rail, and then applying the bond and holding its flat foot bearing the thick layer of solder firmly in contact therewith.

What I do claim, and desire to secure by Letters Patent, is—

1. A cross-bond consisting of a cross-wire and a laterally-projecting strip attached thereto at both ends, substantially as described.

2. A cross-bond consisting of a cross-wire, and a laminated strip attached thereto at both ends, substantially as described.

3. A cross-bond consisting of a cross-wire having a laminated strip attached thereto at both ends and projecting laterally therefrom, substantially as described.

4. A cross-bond consisting of a cross-wire having a laminated strip attached thereto at both ends and provided at its extremity with a flat foot, substantially as described.

5. A cross-bond consisting of a cross-wire having a laminated strip attached thereto at both ends and projecting laterally therefrom and provided with an extensible intermediate portion, substantially as described.

In testimony whereof I have signed my name to this specification in the presence of two subscribing witnesses.

GEORGE B. BLANCHARD.

Witnesses:
B. J. NOYES,
H. B. DAVIS.